Figure 1:
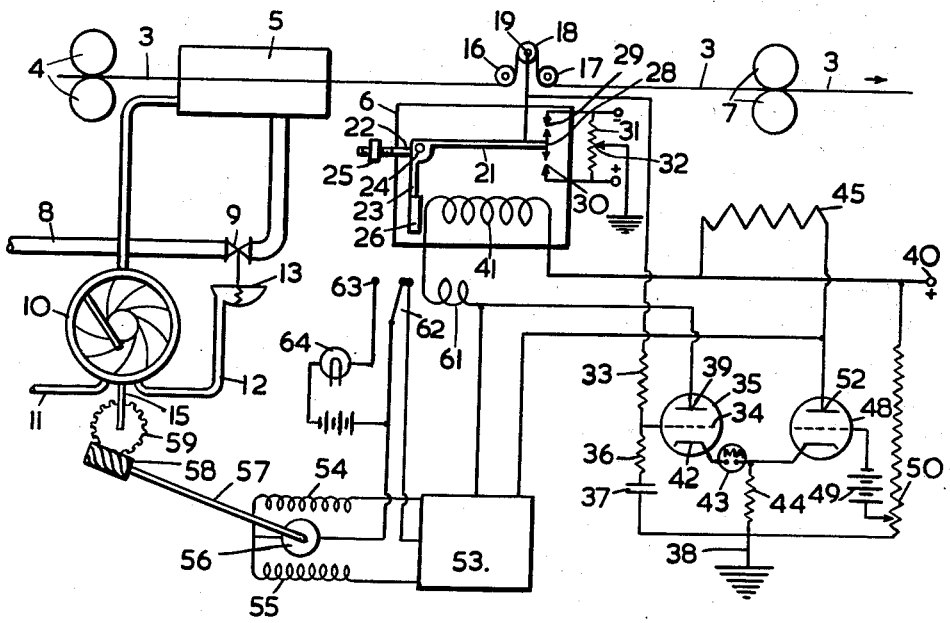

March 29, 1960    E. T. HITCHIN ET AL    2,930,102
TENSION CONTROL
Filed Jan. 20, 1955

E. T. HITCHIN
G. V. GREATOREX
INVENTORS

ATTORNEYS

United States Patent Office 2,930,102
Patented Mar. 29, 1960

2,930,102

TENSION CONTROL

Edgar Tom Hitchin and Gordon Victor Greatorex, Spondon, near Derby, England, assignors to British Celanese Limited, a corporation of Great Britain Application January 20, 1955, Serial No. 483,096

Claims priority, application Great Britain January 22, 1954

3 Claims. (Cl. 28—59.5)

This invention relates to tension control, and particularly to yarn tensiometers for the measurement of tension in running yarns, suitable for use in association with means for varying the conditions affecting the yarn tension so as to control said tension.

According to the present invention a yarn tensiometer for the measurement and/or control of tension in a running yarn comprises a member movable to either side of a mean position and adapted to be subjected to the force of the tension in the running yarn, an electromagnet for applying to said member a balancing force opposing said tension, means for supplying energizing current to said electromagnet and means for increasing or decreasing said current at a rate of change that is maintained so long as said movable member is on one side or the other respectively of said mean position. The magnitude of the energizing current is thus made to vary with the tension in the running yarn, and can be measured by a suitably calibrated instrument to give a direct indication of the tension and/or employed for controlling a change in the conditions affecting yarn tension to which the yarn is subjected, so as to restore the tension to a desired value. The effect of the invention is to avoid a difficulty inherent in the usual methods of tension measurement and control, in which a change of tension is accompanied by a proportionate change in the position of the tension-sensitive element (the movable member) which alters the conditions under which the yarn runs through the device and renders the measurement of tension uncertain. In the present invention the movable element has a negligibly small range of movement, sufficient only, for example, to establish one or other of two electrical contacts, and the amount of the small movement is independent of the tension being measured. Suitable means can be provided for varying the sensitivity and range of action of the tensiometer according to the invention. Thus, the movable member may be provided with mechanical loading means, such as an adjustable counterweight, for adjusting the mean value of the tension to be measured, while the range of movement of the movable member, e.g. the distance between two contacts alternatively engaged thereby, can be made adjustable to vary the sensitivity of the tensiometer. By moving the contacts in opposite directions the range of movement of the member may be varied while, by moving them in the same direction the gap of the electromagnet can be varied.

The preferred means for varying the energizing current of the electromagent in the manner according to the invention comprises a thermionic valve whose grid voltage is maintained by a condenser connected, through suitable resistances, to the grid of the valve and to one or other of two points maintained at different potentials, the connection being effected to one or other of the points by the movement of the movable member.

In applying the tensiometer according to the invention to the control of the tension in the running yarn, it is desirable to employ the same principle as in the tensiometer itself, i.e. to use a difference between the value of the energizing current, or some variable related thereto (e.g. the voltage generated by said current in the coil of the electromagnet or some other fixed resistance) and a standard value of such current or related variable to establish a rate of change in the required direction of the conditions affecting yarn tension. In this way a difference in yarn tension is required only to bring about a change of the conditions affecting tension and not to maintain that change when it has been brought about. The change of condition is affected at a rate depending on the tension error and continues in being after the tension has returned to the desired value and after the rate of change has thereby been reduced to zero.

The invention is particularly (though not exclusively) applicable to the control of the tension in a yarn or a number of yarns in the course of stretching such yarns while they are running through a softening medium, e.g. steam under pressure. U.S.A. Patent No. 2,276,364 describes a method and apparatus for stretching yarns in this way, in which the pressure of the softening medium (a condition materially affecting the tension in the yarn being stretched) is caused to vary with the tension in the yarn. The application of the present invention to the method and apparatus described in U.S.A. Patent No. 2,276,364 involves the introduction of a tension control device in accordance with the invention, whereby a deviation of the yarn tension from a desired value causes a rate of change of pressure of the softening medium, instead of merely a change in that pressure.

Figure 2:
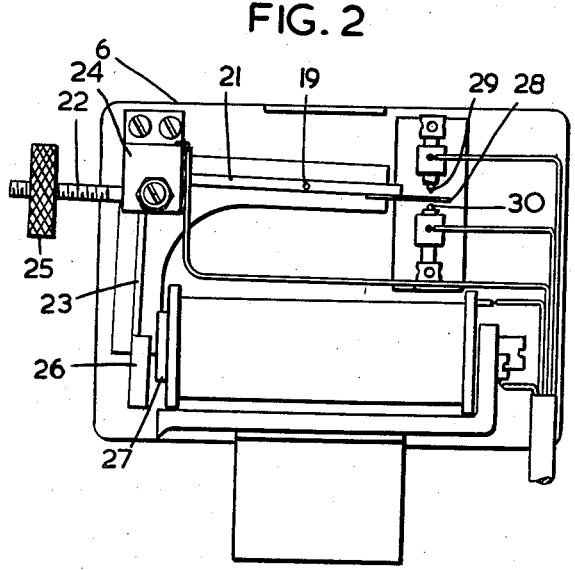
Figure 3:
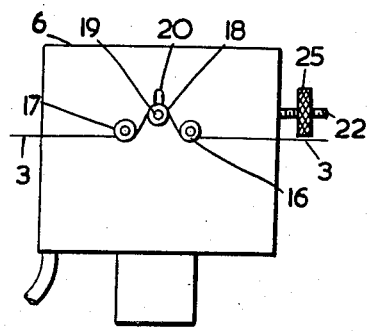

By way of example, one form of tension control device in acccordance with the present invention, and the way of using it for the control of tension in a yarn which is being stretched while running through steam under pressure, will now be described in greater detail with reference to the accompanying drawing in which:

Figure 1 is a diagrammatic sketch showing the layout and circuit diagram of the stretching apparatus and control device, and Figure 2 is an internal view and Figure 3 an external view of the tensiometer.

For the purposes of the stretching operation, yarn 3 is supplied by a pair of feed rollers 4 to a stretching chamber 5, from which it passes through the tensiometer of the present invention, generally indicated at 6, and thence to a pair of stretching rollers 7 which are driven with a peripheral speed greater than that of the feed rollers 4 so as to effect the stretching of the yarn in the stretching chamber 5. The stretching chamber 5 is supplied with steam under pressure from a steam supply line 8 through a control valve 9, and the pressure is accurately controlled by a pneumatically operated steam controller 10 of known type. The pneumatic controller 10 is actuated by compressed air from a supply 11, and in turn supplies air under pressure by an air line 12 to a diaphragm 13 which actuates the control valve 9. In this way the controller 10 is adapted to maintain the steam pressure in the stretching chamber 5 at the desired value in accordance with the position of a setting shaft 15, by the rotation of which the desired value can be adjusted. This constitutes the means for varying the conditions affecting the tension in the yarn (namely the steam pressure) in association with which the tensiometer of the present invention is employed.

The tensiometer comprises three light and freely mounted pulleys 16, 17, 18, of which the outer pulleys 16, 17 which engage above the yarn 3, are on fixed axes on the casing of the tensiometer 6 (Figure 3) while the middle pulley 18, over which the yarn 3 passes, is movable. The middle pulley is mounted on a spindle 19 extending laterally from the horizontal limb 21 of a bell-crank lever 21, 22, 23 constituting the movable member of the tensiometer. The spindle 19 passes through a short slot 20 in the casing of the tensiometer. An extension 22 of the horizontal limb 21, beyond the insulated pivot 24 of the lever, carries a counterweight 25 which partly counteracts the tension in the yarn 3 pulling the middle roller 18 downwards. The counter-weight 25 is assisted by an iron armature 26 at the end of the vertical limb 23 of the bell-crank lever, the armature 26 being attracted by an electromagnet 27 supplied with energizing current as hereinafter described. The free end 28 of the horizontal limb 21 is adapted to make electrical contact alternatively with an upper contact 29 and a lower contact 30, to which are applied respectively a negative and a positive voltage with reference to earth, the contacts being connected to opposite ends of a potentiometer 31 whose adjustable intermediate point 32 is earthed.

The horizontal limb 21 of the bell-crank lever is electrically connected by way of its insulated pivot 24 through a resistance 33 to the grid 34 of a triode valve 35 and, through a further resistance 36 to a condenser 37 the other side 38 of which is connected to earth. The anode 39 of the valve 35 is connected to a source of high tension voltage 40 through the coil 41 of the electromagnet 27, which is thus energized by the anode current. The cathode 42 of the valve is connected through a milliammeter 43 and a suitable resistance 44 to earth.

The electromagnet 27 and thermionic valve system thus described constitute the means for applying to the movable member 21, 22, 23 a balancing force opposing the tension in the yarn 3 and for varying the balancing force in a sense such as to balance said tension. If the tension in the yarn 3 should rise, the bell-crank lever arm 21 is pulled downwards and makes contact with the lower contact 30, thus applying to the grid 34 of the valve 35, and to the condenser 37, a positive voltage. This has the effect of raising the grid voltage, at a rate determined by the magnitudes of the resistances 33, 36 and the condenser 37, and of increasing the anode current until the electromagnet 27 (energized by the anode current) attracts the armature 26 of the bell-crank lever sufficiently to break the contact made at 30 by the increased tension in the yarn 3. Thus the force applied to the bell-crank lever by the electromagnet is increased till it balances new value of the yarn tension. If the yarn tension should fall on the other hand, the arm 21 is pulled upwards against the reduced tension by the counterweight 25 and the force of the electromagnet 27, and engages the upper contact 29. This applies a negative potential to the grid 34 and the condenser 37, and the current in the electromagnet 27 decreases until it is low enough for the new tension in the yarn 3 to break the contact at 29. In practice, the bell-crank lever arm 21 oscillates continually from one contact 29, 30 to the other, and gives rise to a mean value of the grid voltage (stabilised by the condenser 37 and the resistances 33, 36) which depends on the relative times spent by the lever arm 21 in engagement with the respective contacts 29, 30. This in turn depends on the tension in the yarn 3, and the resulting anode current is substantially proportional to that tension. The milliammeter 43 in the cathode circuit of the valve 35 measures the anode current and can be calibrated in terms of the yarn tension obtaining at any moment.

In order to establish a rate of change of the steam pressure such as to restore the yarn tension to its desired value, the voltage across the electromagnet coil 41 is compared with the voltage across a resistance 45 carrying a standard current, and the difference in voltage is employed to cause a rotation of the setting shaft 15 of the pneumatic controller 10 and thereby a rate of change of the steam pressure in the stretching chamber 5.

This is done by the use of a second triode valve 48, similar to the first valve 35 but supplied with a grid voltage from an independent source 49, 50. The anode 52 of the second valve is connected to the source of high tension voltage 40 through the resistance 45, which is of the same magnitude as that of the electromagnet coil 41, and the voltage difference at the two anodes 39, 52 is tapped off and fed to a suitable amplifier 53. The amplifier supplies the field coils 54, 55 of a split field motor 56, whose shaft 51 connected by gears 58, 59 to the setting shaft 15 of the pneumatic controller 10. The motor 56 runs at a speed proportional to the voltage difference at the anodes 39, 52 of the two valves 35, 48 and in a direction appropriate to the direction of the voltage difference, and adjusts the steam pressure which the pneumatic controller 10 is set to maintain in the stretching chamber 5. A rate of change of steam pressure is thus established which is proportional to the voltage difference at the anodes of the two valves and in a direction appropriate to the direction of the voltage difference. The rate of change of steam pressure thus established is proportional to the voltage difference and therefore to the difference between the anode currents, which are carried respectively by the electromagnet coil 41 and the standard resistance 45 with which it is compared.

The grid voltage of the second valve 48 is adjustable so as to adjust the tension which will be maintained by means of the device, by adjusting the anode current of the second valve 48 and therefore the voltage across the resistance 45 with which the electromagnet coil 41 is compared.

In the operation of stretching yarns it is convenient to stretch a large number of yarns simultaneously side-by-side. In this case the tension control may be applied to one of the yarns only, so as to determine the steam pressure for the whole of the yarn being stretched. Means may be provided for switching off the control in the event that the yarn 3 engaged by the tension control device should break. In this case the tension falls away to zero and the current in the anode circuit of the first valve 35 drops sharply. A relay 61 in the circuit of the electromagnet coil 41 is provided which, while energized, closes a switch 62 in the armature circuit of the split field motor 56. When the current through the electromagnet 27 fails, the switch 62 is opened so as to stop the motor 56 and to leave the pneumatic controller 10 in the position which it occupied at the moment of yarn breakage. The opening of the switch 62 in the motor circuit may be adapted to close a second switch 63 in a circuit containing a warning lamp 64 by which the operative may be advised that the control is out of action.

Having described our invention, what we desire to secure by Letters Patent is:

1. A yarn tensiometer for the measurement and control of tension in a running yarn, said tensiometer comprising a member movable to either side of a mean position and adapted to be subjected to the force of the tension in the running yarn, an electromagnet for applying to said member a balancing force opposing said tension, means for supplying energizing current to said electromagnet, means for initiating a progressive increase in the current whenever the movable member is on one side of said mean position and for initiating a progressive decrease in the current whenever the movable member is on the other side of said mean position and means for indicating the value of the current, the said value thereby affording a measure of the tension in the yarn.

2. A device for maintaining substantially constant tension in a running yarn while the latter is subjected to conditions which affect the tension in the yarn, said device comprising a member movable to either side of a mean position and adapted to be subjected to the force of the tension in the running yarn, an electromagnet for applying to said member a balancing force opposing said tension, means for supplying energizing current to said electromagnet, means for initiating a progressive increase in the current whenever the movable member is on one side of said mean position and for initiating a progressive decrease in the current whenever the movable member is on the other side of said mean position, and means for initiating a progressive change in the conditions which affect the tension in the yarn said latter means being under the control of the energizing current of the electromagnet and said progressive change continuing so long and only so long as the said current differs from a standard value and in a sense such as to restore said current to said standard value.

3. A device for maintaining substantially constant tension in a yarn while the latter is being stretched while running through a softening medium under pressure, said device comprising a member movable to either side of a mean position and adapted to be subjected to the force of the tension in the running yarn, an electromagnet for applying to said member a balancing force opposing said tension, means for supplying energizing current to said electromagnet, means for initiating a progressive increase in the current whenever the movable member is on one side of said mean position and for initiating a progressive decrease in the current whenever the movable member is one the other side of said mean position, a pressure control instrument adapted to maintain the pressure of the softening medium at a desired adjustable value, and means under the control of the energizing current of the electromagnet, for initiating a progressive change in the adjustment of the pressure control instrument, said latter means operating so long and only so long as the said current differs from a standard value and in a sense such as to restore the said current to said standard value.

References Cited in the file of this patent

UNITED STATES PATENTS

| | | |
|---|---|---|
| 1,966,214 | Palmer | July 10, 1934 |
| 2,509,250 | Roberts | May 30, 1950 |
| 2,617,007 | Atkins | Nov. 4, 1952 |
| 2,674,127 | Garrett et al. | Apr. 6, 1954 |
| 2,695,519 | Lodge | Nov. 30, 1954 |
| 2,767,576 | Seney | Oct. 23, 1956 |